Aug. 3, 1965   W. H. HOWELL   3,198,665
STORAGE BATTERY PLATES AND METHODS FOR THEIR MANUFACTURE
Filed Dec. 2, 1963
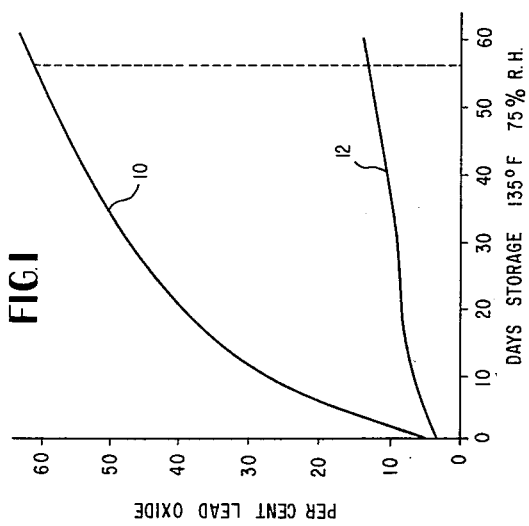
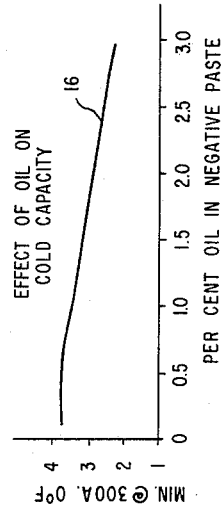
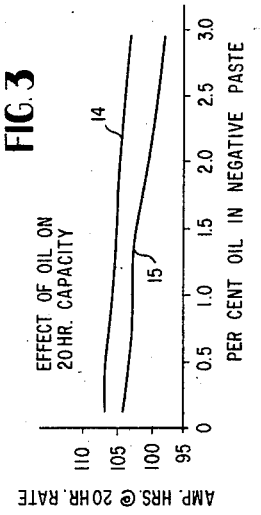
*INVENTOR.*
WILLIAM H. HOWELL

United States Patent Office 3,198,665
Patented Aug. 3, 1965

3,198,665
STORAGE BATTERY PLATES AND METHODS FOR THEIR MANUFACTURE
William H. Howell, Fairfield, Conn., assignor to The Electric Storage Battery Company, a corporation of New Jersey
Filed Dec. 2, 1963, Ser. No. 327,342
3 Claims. (Cl. 136—78)

This application is a continuation-in-part of Serial No. 713,642, filed February 6, 1958, for "Storage Battery Plates and Methods for Their Manufacture," which is a continuation-in-part of Serial No. 481,640, filed January 5, 1955, for "Storage Battery Plates and methods for Their Manufacture."

This invention relates to negative storage battery plates having a new and high order of resistance to oxidation and sulfation and to the method of treating negative plates to impart thereto said oxidation and sulfation resistance.

The problem of preventing atmospheric oxidation of pure sponge lead, which characterizes the negative plates of lead-acid type storage batteries in the absence of electrolyte, has long been recognized. Dry-charged negative plates tend rapidly to lose their charge by oxidation of the pure sponge lead with resultant loss of charge which would otherwise be present at the time of addition of electrolyte.

In accordance with the present invention, it has been discovered that a dry-charged plate for a battery may be protected against atmospheric oxidation by applying over each of the particles of the plate a protective film which effectively retards the oxidation, but which is permeable to the electrolyte of the battery. My invention has its principal application to negative plates for storage batteries of the lead-acid type, such as plates consisting substantially of pure sponge lead. A dry-charged plate of pure sponge lead may be considered as made up of a multiplicity of particles. These particles may themselves be attached one to the other and jointly form crystalline structures which give to the plate as a whole its spongy character. Such a plate is characterized by high porosity with the pore sizes relatively small. The small pore size requires particular techniques for applying the coating to the particles of the plate after it has been formed and dried.

Heretofore, solutions have been offered to the problem of preventing atmospheric oxidation of dry-charged plates. These have included the use of oxidation inhibitors which function by reason of chemical action. The difficulty with them is that while a certain amount of protection has been provided during the dry-charge step, they have been relatively ineffective to prevent progressive atmospheric oxidation while the plates are in storage.

Contrary to the general current belief that oily substances used as additives to a battery plate are harmful, I have discovered, in accordance with the invention, that such oily substances, if used in the manner hereinafter explained, are advantageous and highly unexpected results are achieved by the resistance to atmospheric oxidation of dry-charged plates and by the resistance to sulfation of negative plates in the wet charge state.

As I conceive my invention, an oily substance of mineral origin can be dispersed throughout the porous sponge plate and form over all of the particles thereof a protective film. This protective film functions in a physical manner, and not by reason of any chemical reaction, to exclude atmospheric moisture and oxygen from contact with the particles of active material and thus prevents oxidation of the active material. As a result of many tests, the conclusion is warranted that the important essential is to exclude atmospheric moisture from contact with the sponge lead. This I have accomplished, and as a result have reduced the loss of the charge from 85% of original capacity for plates not embodying my invention to a loss of only 5% for plates embodying the present invention. The tests for the foregoing plates were identical with the exception that one set of plates embodied the invention and the other set of plates did not.

The method of practicing the invention is as follows. The conventional starting materials are used, more particularly, lead oxide and an expander. After they have been mixed together a relatively short time, the oily substance is added in amount within the range of from about .05% to about 3.0% by weight of the mixture of the lead oxide and the expander. Increased oxidation resistance may be obtained at the expense of some reduction in capacity of the plate by increasing the amount of oily substance far beyond the preferred upper limit of 3.0%. In this connection, the amount of the additive by weight will vary to substantial degree depending upon the percentage of volatiles present, the volatiles themselves to large degree being eliminated during the subsequent steps of the particular process now being explained.

After the addition of the oily substance of mineral origin, mixing is continued for a few more minutes during which water is added in customary amount. Acid is then added at conventional rates with mixing continued to bring the mixture to the proper density and plasticity for the pasting of the plates. The relative amounts of water and acid are not important to the present invention, since it is applicable to all of the conventional methods of producing the negative paste for the pasting of the plates, the added oily substance of mineral origin having only a minor effect on the plasticity of the paste. With the oily substance of mineral origin added in larger percentages, the relative amounts of water and acid may be varied, if desired, to produce improved pasting characteristics.

While the foregoing represents one suitable way in which the oily substance may be added, it has also been found that it can be added at any other selected stage of the mixing process, for example, with or following the acid addition, and with or following the final water addition, and in some instances the oily substance may be added with the expander.

In accordance with the present invention, the oily substance added to the active material of the negative plate consists of petroleum. The term oily substance of mineral origin is restricted for the purposes of this application to the mineral oils, and more particularly to the fractions thereof having boiling points high enough to assure the retention in the negative plate of an oily substance or residue in amount ranging upwardly from about 0.05% of the dry starting materials for the negative plates, in the preferred form of the invention. The oily substance of mineral origin dispersed through the negative material shall include a mineral oil or petroleum fraction having a boiling point above that of kerosene. Numerous examples will hereinafter be set forth. From them, it will be seen that the lube oils will be preferred, whether they have a paraffin base or a naphthenic base; whether they be saturated (aromatic) hydrocarbons or unsaturated; and whether they be mixtures of one or more of the foregoing. The oily substance can be a still residue or waxy petroleum material dissolved in a comparatively low boiling solvent. Under this condition, the solvent is lost in processing, and the residual high boiling material is the effective agent. This procedure has been used to aid the dispersion of high boiling materials throughout the active material of the plate.

Negative plates having thoroughly dispersed throughout the active material of a quantity of the oily substance of mineral origin not only exhibit the resistance to oxidation as a result of, and following, the dry-charging process, but they also have improved resistance to sulfation. The fact that the oily substance inhibits sulfation makes the present invention useful for negative plates whether dry-charged or directly used in wet charge batteries.

As used herein, the term "sulfation" is defined to refer to the formation at the negative plate of a sulfate which is not readily electrochemically reversible by means of charging currents normally utilized in battery operation. The foregoing definition of the term "sulfation" is in accordance with the usage made thereof by those skilled in the battery art. The sulfation which occurs in respect to the negative plates (as well as the positive plates) is undesired and yet is present in the operation of lead-acid batteries. For the negative plates under conditions of high gravity for the electrolyte, for example, when fully charged at about 1275 specific gravity, the rate of suphation is high. It decreases with decrease of specific gravity. Thus, some sulfation can be expected in the operation of any lead-acid battery. Any reduction in sulfation represents a substantial advantage in extending the life of the battery. It has been found that the addition of the oily substance of mineral origin minimizes self-discharge and resultant sulfation.

From the foregoing, it will be seen that the present invention embraces conventional powdered materials utilized for pasting negative plates to which there is added the oily substance of mineral origin in quantities from 0.05% to 3.0% by weight of the dry material. After the addition of water and acid as may be needed to convert the dry mixture into a paste of consistency desired to fill the grids, they may be subjected to conventional processing steps which frequently include drying, setting, soaking and charging.

When plates are not immediately assembled into a battery together with the electrolyte, they may be washed in water and then subjected to the dry-charging process.

After the mixing and pasting of the plates, and completion of setting, they are charged by any conventional process to convert the basic lead sulfate (formed by the addition of the acid) to pure sponge lead. The fully charged negative plates are then washed in water and subjected to the dry-charging process. After the drying of the negative plates, they are assembled into batteries along with the fully charged positive plates. Optionally, the negative and positive plates may be assembled as elements, fully charged, and both dried at the same time preparatory to completion of the battery assembly. Alternatively, unformed plates and elements may be jar formed or tank formed and utilized in conventional wet charge battery assemblies without ever being dried.

As exemplary of the new and high order of oxidation resistance and of other characteristics which may be attained by the addition of the selected oily substance of mineral origin, reference may be had to the attached drawings wherein:

FIGS. 1–4 are graphs helpful in the understanding of the present invention.

Referring now to FIG. 1, it will be observed that the per cent lead oxide in the negative plate has been plotted as ordinates against time as abscissae. For the standard dry-charged negative plate there is a rapid rise in the per cent of lead oxide present as shown by the curve 10. The curve for negative plates having the protective coating formed by an oily substance show a high order of oxidation resistance. In the negative plates represented by curve 12, the lead oxide, after a period of ten days, is present in amount one-fifth the amount present in the plates represented by the curve 10. For curve 12, a lube oil was used.

In terms of battery performance, the foregoing means that storage batteries including plates treated in accordance with the invention can be stored for long periods of time and, at the time the battery is needed the electrolyte may be added with assurance that the battery will deliver a large percentage of its rated capacity. The invention has important further advantages at the factory itself. It means that the negative plates treated in accordance with the invention may be stored over a period of months in the presence of an atmosphere which may be of a higher humidity than that normally encountered at service stations or the like where batteries are sold to the retail trade. Curve 12 of FIG. 1 graphically represents the improvements for a lubricating oil of the paraffinic type. It is a straight mineral oil, meaning that it has no additives. It has a viscosity of 150 to 170 S.S.U. at 100° F. This example No. 1 is exemplary of the improvements achieved with the addition of 0.75% of mineral oils currently available on the market, namely, as Example No. 2, a lubricating oil having a viscosity of 709 S.S.U. at 100° F. It too is a paraffinic mineral oil without additives. As Example No. 3, there was used a lubricating oil of paraffinic mineral origin with additives. Also used, Examples Nos. 4 and 5, were lubricating oils having detergent/oxidation inhibitors therein and respectively having viscosities of 240 and 530 S.S.U. at 100° F. As Example No. 6, there was used a lubricating oil having a naphthenic base. As Example No. 7, there was used a lubricating oil of mineral origin with additives, this oil being more fully described hereinafter. Examples 8 and 9 were lubricating oils of mineral origin without additives, paraffinic origin and blended from Pennsylvania crudes Example No. 8 was a lubricating oil SAE 30, while Example No. 9 had an SAE of 40.

As an example of added advantages, reference will be made to tests in which the oily substance added to the negative plate consisted of a lubricating oil Example No. 1 later more fully described. It was added during the mixing process in quantity of 0.75% by weight of the dry active materials of the negative plate. In an accelerated test where the treated negative plates were stored for twenty-eight days at a temperature of 135° F. with the relative humidity quite high, of the order of 95%, the cranking capacity at the completion of the twenty-eight day test was 95%. Batteries including untreated negative plates subjected to the same twenty-eight day test produced a cranking capacity of but 17% of rated capacity. The foregoing means, as a practical matter, that batteries with treated plates can be used immediately as replacements in automobiles and the like without the need for further charging. For example, the dealer need only add the electrolyte and install the battery in a car. Another way of presenting the advantages is in terms of the length of time during which the battery will deliver current needed to start an automobile. With the treated plates, the battery delivered current at the rate of 300 amperes for 4.21 minutes. A battery having the same original capacity but with untreated plates delivered 300 amperes for less than a minute, actually less than three-fourths of a minute. The terminal voltage at the end of the test in each of the foregoing tests was one volt per cell and three volts for the three-cell battery used in the test.

Normal untreated dry-charged negative plates subject to oxidation during storage may, and are likely to, suffer irreparable damage. The increased oxidation resistance of the treated negative plates produced in accordance with the present invention means that actual product improvement will be realized by the consumer. The treatment of the negative plates in accordance with the present invention also improves the sulfation life of the batteries. This comes about as follows:

Mixing lubricating oil of mineral origin characterized by a boiling point above 300° C. with the finely divided active ingredients of the negative paste mix in the range of .05% to 3.0% by weight of said finely divided active material in the dry state assures homogeneous distribution of the oil throughout the mix, which normally includes a preponderance of finely divided lead oxide. Oil in the foregoing range does not impare either the desired oxidation of the free metallic lead particles in the mix or the formation of the desired basic lead sulfates during the setting of the plates after pasting.

When the negative plates are conventionally formed, they are placed in a sulfuric acid solution and the lead oxides and basic lead sulfates are electrochemically converted to pure sponge lead. It is believed that during the formation process the oil, if it be present in the paste mix, forms a film over the particles of pure metallic lead as the particles of the latter grow and combine to form a sponge-like matrix. The film produced by adding oil to the mix in the specified range is not thick enough to block normal electrolytic action of the battery.

Ordinarily, antimony is alloyed with the lead used for the grids for both the positive and negative plates. Antimony, if present on the surface of the negative plates of a battery with electrolyte, will cause local action which results in the formation of lead sulfate and the liberation of hydrogen. In addition, the presence of antimony reduces the maximum voltage the plates and hence the battery can obtain during charge. Small amounts of antimony leach out of the grid of a negative plate into the paste mix during setting, while the paste mix is wet. Additional amounts of antimony are deposited from the positive plate grids unto the negative plates during the charging of a battery. If then a battery with electrolyte, as in the case of a wet charged battery, remains on open circuit stand for even a short while, particularly in hot weather, a very inactive form of sulfate crystal grows on the negative plates of the battery and results in a permanent loss of battery capacity. If attempt is made to recharge the battery so as to bring the negative plates to full charge, there is a possibility that the positive plates which do not lose charge to the same extent under these conditions may be overcharged, thereby damaging the positive plates and also transferring more antimony from the positive plate grids unto the negative plate surfaces. Generally, during the charging of a battery having antimony in and on the negative plates, the charge voltage cannot rise above 2.5 volts before hydrogen evolves. However, if a thin film of oil is present on the sponge lead of the negative plate as in accordance with the teaching of the present invention, the combination of the electrons in the sponge lead with ions in the electrolyte is impeded sufficiently to raise the charge voltage of the battery to about 2.65 to 2.8 voltage at the end of charge. As a result of this increased charge voltage, antimony which may be present in the negative plate is evolved from the surface thereof in the form of stibine gas. Thus, when the charge voltage rises to a maximum, antimony, the major cause of sulfation, is eliminated from the negative plates at the end of the formation process before it can promote local action.

In accordance with permissible practice prior to the present invention, it has been necessary to apply extraordinary caution in producing storage batteries which were to be stored for a considerable length of time before first use thereof. This involved the careful drying of all of the component parts, particularly the separators, and the storage of the batteries under conditions which would minimize exposure of the plates to the atmosphere. Not only are the foregoing operations costly, but also the failure at any period before use to maintain them protected against high humidity and the like greatly accelerates deterioration.

In accordance with the present invention the batteries need not be carefully dried and the separators need not be particularly dry. It has been found that separators which include water in amount as high as 5% may be used in the battery without substantial deterioration of the charge over extended periods of time. As an example, tests were conducted with standard untreated negatives and with negatives treated in accordance with the present invention. After one month the untreated negatives in 95° F. storage yielded but 65% of rated capacity while the batteries with the treated negatives yielded 97% rated capacity. After three months the batteries with the untreated negatives produced but 36% of capacity while the capacity of the treated negatives had not decreased below 97%. In the foregoing tests the temperature of 95° F. produced high humidity conditions within the battery itself due to the presence of the water in the separators. Thus the conditions of these tests may be comparable to storage conditions obtained in tropical climates. Batteries constructed in accordance with the invention may be stored for indefinitely long periods of time without taking the precautions which have hitherto been deemed necessary. Obviously if in addition such precautions are taken, and the separators dried, then the treated batteries will not deteriorate due to loss of capacity, as a result of oxidation of the negative plates, to any degree comparable to that heretofore experienced with untreated plates.

Example No. 1, just described, was a paraffinic solvent refined, lubricating oil which did not include any additives or inhibitors. Its more detailed specifications are as follows:

| | |
|---|---|
| Gravity, ° API | Min. 29.5. |
| Color, ASTM | 1–3. |
| Pour point ° F. | Max. 10. |
| Flash, COC, ° F. | Min. 390. |
| Fire, ° F. | 465. |
| Viscosity, SSU, 100° F. | 150–170. |
| Viscosity, SSU, 210° F. | 42–45. |
| Viscosity index | Min. 90. |
| Carbon residue, percent $x$ (Ramsbottom) | Max. 0.10. |
| Neutralization value, TAN$^{-c}$ | Max. 0.05. |
| Corrosion 212° F. | Negative. |

Example No. 7 represents a lubricant or oil of contrasting composition in that it is a highly compounded product that contains additives for the purpose of increasing film strength and also for the retardation of oxidation and foaming. It does not have a detergent. More detailed data are as follows:

| Example No. 7 | Viscosity | | Approximate SAE No. | Pour Point |
|---|---|---|---|---|
| | 100° F. | 210° F. | | |
| No. 8 | 2,215 | 132 | 70 | 0° F. |

There have also been used lube oils without detergent, and lube oils with detergent.

Negative plates having oxidation resistance comparable with those containing Example No. 7 were obtained with each of the foregoing oils, Examples 2, 3, 4 and 5 added in amounts from about .05% to about 3%. The graph of FIG. 2 illustrates the result of a thirteen-day accelerated oxidation test in which negative plates were exposed to a temperature of 135° F. and a relative humidity of from 80–85%. One series of plates tested was treated with the lube oil of Example 2, and other series of plates was treated with the lube oil of Example 3. The data obtained from each of these series of plates showed little difference as between the two oils. As a result, a single curve 13 was plotted from the composite data. As is evidenced from FIG. 2, the oxidation resistance of a treated negative plate increases quite rapidly within the range of from about .05% oil to about 0.4% oil, the knee of the curve occurring at about 0.2% oil. Thereafter, the oxidation resistance increases at a lower rate and not sufficiently to warrant the addition of oil above about 3%. Although some increase in oxidation resistance is, of course, obtained upon increasing the amount of oil, such increase may not be warranted particularly in view of the effect that the addition of oil above 3% may have on the capacity of the battery. It is to be observed from the curves in FIG. 3, which represent the effect of oil on the twenty-hour capacity of a battery, that as the amount of oil is increased, the twenty-hour capacity tends to decrease.

However, the decrease is of a surprisingly small order. Considering the fact that the batteries illustrated by curves 14 and 15 are rated at 100 ampere hours and that the decrease in the twenty-hour capacity to the rated capacity was not obtained until oil had been added in excess of 2% for curve 15 and further that the capacity of the batteries represented by the test for curve 14 was not reduced below rated capacity with oil added in amount as high as 3%, it will be seen that the advantages set forth above have been fully realized with minimum disadvantages. Even with the batteries represented by the curve 15, oil as high as 3% could be added without excessive loss of capacity and without such loss as would be noticeable to any battery user. Here again one series of negative plates was treated with the lube oil of Example 2 and the other series of negative plates was treated with the lube oil of Example No. 3. The series of plates treated with the lube oil of Example No. 2, as can be seen in curve 14, had a high capacity at the beginning of the test than the series of negative plates treated with the oil of Example No. 3, represented by curve 15. It is to be noted, however, that although the initial capacities of the plates were different, the rate of decrease in capacity after oil was added over the plotted range from about .05% to 3% was low and of the same order for both cases.

Yet another test run on the effect of lubricating oil on the capacity of a battery is illustrated by curve 16 in FIG. 4, which represents the effect of oil on the cold capacity of a battery. Here the ordinates are plotted in terms of time during which it takes to discharge a battery at a rate of 300 amperes. When maximum capacity is desired, a 0.75% upper limit may be selected as best. However, if considerations of long life in storage are paramount and some loss of capacity can be tolerated, the oil may be greatly increased above 0.75%. In general, the upper limit will be selected as about 3% since the advantages as regards oxidation resistance are about a maximum with 3% of oil. However, if oil be added above 3%, the advantages of the invention will continue to be realized insofar as oxidation resistance is concerned.

From the experimental work which has been done, the conclusion may be drawn that lubricating oils of mineral origin which include additives for the purpose of retarding oxidation of the oils themselves do not appear to be particularly advantageous over the "non-additive" oils; neither do they appear to be harmful. Such additives, while they may increase the oxidation resistance of the oil itself, do not appear to have any effect upon the oxidation rate of negative plates of batteries during storage and due to exposure to the atmosphere. The conclusion to be drawn is that the additives for the purpose of retarding oxidation of the oil are not necessary to the practice of the present invention.

From the foregoing, it will be seen that many materials sold under different trademarks or tradenames may be utilized in the practice of the present invention, provided they include mineral oil, and provided that the other substances are not attacked by the electrolyte and are not active chemically with the materials within the battery. The oily substance of mineral origin may be added to the powdered materials for the negative plate in the form of an emulsion. The emulsion will be found particularly useful when the oily substance is added during the wet mixing of the negative active material.

Inasmuch as it is believed that the new results achieved in accordance with the present invention are primarily due to the presence within the negative plate of the protective film formed about all of the particles of the pure lead, that is to say that the protective action is largely physical due to the presence of the protective film, those skilled in the art will understand that many different oily substances of mineral origin having boiling points above 300° C. may be utilized in practicing the invention.

With all of the various lubricating oils which may be utilized it is important that they be converted to a form in which they may be dispersed throughout the negative plate. It is to be understood, however, that some of the substances may be dispersed in aqueous solutions and others in lighter fractions of the mineral or fixed oils, the important fact again being the deposition within the pores or interstices of the plate of a protective film of oil.

It will be remembered that one Example No. 7 given above had an SAE No. of 70. This is a relatively heavy oil, one of relatively high viscosity. For oils of greater viscosity and for the heavy residues, such as the tars and waxes forming a part of the mineral oil, it will be necessary to utilize in conjunction with them a solvent in which they are thoroughly dissolved. This solution can then be utilized to impart to the active material of the negative plates the oily substance of mineral origin characterizing the present invention.

In each instance, the present invention is to be contrasted with simple dipping of the plate into an oily substance, and it is to be further contrasted with both protective coatings enclosing the plate and those which penetrate but a short distance below the surface of the plate. To impart to the plate the resistance to oxidation of the atmosphere, it is conceived that the oily substance must form a protective coating about all of the particles of the active material of the negative electrode. Accordingly, in practicing the invention it is important that the oily substance penetrate all the voids of the negative plate. The penetration of all the voids and the effective coating of each of the particles of active material comprising the plate is readily accomplished when the oily substance is added during the mixing of the plate material.

It has been further found that the presence of the oily substance of mineral origin materially decreases hydrogen evolution from a battery on open-circuit stand. For example, with cells having untreated negative plates, hydrogen evolution was measured in terms of cubic centimeters per hour per cell. For the first two weeks on stand, the hydrogen evolution per cell was approximately 12 ccs. per hour. For cells having negative plates including the oily substance of mineral origin representing about 0.4% of lubricating oil, the hydrogen evolution during the first two weeks varied from less than 2 ccs. per hour to less than 5 ccs. per hour. Over a period of twelve weeks, the hydrogen evolution was less throughout the period for the treated plates than for the untreated plates. During the same twelve-week period, the decrease in gravity was materially less with the treated plates than with the untreated plates. The decrease in specific gravity for the untreated plates was about 20% greater than for the treated plates. After many cycles of operation the hydrogen evolution was markedly less than with untreated plates.

The foregoing advantages of the present invention are indicative of the decrease in sulfation of the treated negative plates. This has been further borne out by field operation of batteries.

It has been mentioned above that sulfation of the negative plate occurs at higher rate with higher specific gravities of electrolyte. Sulfation likewise occurs at higher rate with higher temperatures of operation. Such higher temperatures are encountered in the warmer climates, particularly in the southern United States. In such warmer climates, materially greater battery life has been achieved with batteries embodying the present invention.

It has been mentioned above that the oily substance of mineral origin can be added to the dry mixture of ingredients for the negative plate, as well as to the wet mixture thereof. The oxides of lead are most commonly used as base materials for the negative electrode plates. However, plates can be made from finely divided lead and lead sulfate. The present invention is applicable generally to negative plates for lead-acid batteries. In the claims, I have used the phrase "finely divided negative material" to include the various mixtures heretofore utilized in pasting the grids for negative plates.

I have also utilized in the claims the phrase "an oily substance of mineral origin" as a generic term to cover petroleum fractions having boiling points well above the temperatures likely to be encountered by the negative plates of batteries during use and having the characteristics that at the time they are mixed with the finely divided negative material, they can be thoroughly dispersed therethrough, as for example, in the manner in which the heavy greases and the like are dissolved in a solvent. More particularly, the preferred petroleum fractions are mineral oils having boiling points above about 300° C. (572° F.) and including the lubricating oils petroleum jelly, paraffin and paraffin wax.

In summary, there is produced in accordance with the present invention dry-charged negative plates having the particles thereof individually coated with an oily substance of mineral origin to impart thereto high oxidation and sulfation resistance without interference with passage of ions during charging and discharging of the battery and having a chemical composition which is not deleterious to the electrolyte, normally sulphuric acid, and which does not affect the active material of the positive plates or the separators disposed between them.

I claim:

1. The method of increasing both the oxidation and the sulfation resistance of the negative plates of lead acid storage batteries by causing at the time of first formation of said plates a petroleum fraction of mineral origin to be dispersed throughout the charged active material, consisting essentially of particles of pure sponge lead, to form a protective film which comprises mixing together to form a pastable mixture finely divided negative material, comprising predominantly lead oxide, acid, water, an expander and said petroleum fraction of mineral origin having a boiling point above 300° C. selected from the group consisting of the lubricating oils, petroleum jelly and paraffin in the amount of from 0.05% to about 3% by weight of said finely divided negative material and said expander in their dry states, said mixing thoroughly dispersing said petroleum fraction throughout said pastable mixture preparatory to formation of said protective film, pasting said mixture onto the grids of said negative plates, setting said mixture on said grids, and charging said negative plates to convert electrochemically said negative material to charged active material of sponge lead characterized by having thereon said protective film of said petroleum fraction.

2. The method recited in claim 1, said petroleum fraction being present in an amount within the range of from 0.2% to about 3% by weight of said finely-divided negative material and expander in their dry states.

3. The method recited in claim 1, said petroleum fraction being in amount within the range of from 0.2% to 0.75% by weight of said finely-divided negative material and expander in their dry states.

References Cited by the Examiner
UNITED STATES PATENTS

| | | | |
|---|---|---|---|
| 1,048,773 | 12/12 | White | 136—129 |
| 1,459,659 | 6/23 | Ellis et al. | 136—154 |
| 1,468,341 | 9/23 | Carter | 136—154 |
| 2,747,008 | 5/56 | Sundberg et al. | 136—33 |
| 2,759,037 | 8/56 | Greenburg et al. | 136—26 |
| 2,803,690 | 8/57 | Stevens | 136—6 |
| 2,946,707 | 7/60 | Sperber | 136—154 |

OTHER REFERENCES

Vinal: Storage Batteries, 3rd edition, 1940, page 308.

JOHN H. MACK, *Primary Examiner.*

MURRAY TILLMAN, *Examiner.*